United States Patent [19]

Baxendale

[11] 3,951,241
[45] Apr. 20, 1976

[54] HYDRAULIC DISC BRAKE
[75] Inventor: Charles L. Baxendale, Burleson, Tex.
[73] Assignee: Mechanics, Incorporated, Fort Worth, Tex.
[22] Filed: Apr. 23, 1975
[21] Appl. No.: 570,785

[52] U.S. Cl.............................. 188/72.4; 188/369
[51] Int. Cl.²......................................... F16D 55/10
[58] Field of Search ............ 74/17.8, 18; 188/72.4, 188/72.5, 366–370; 277/73, 103

[56] References Cited
UNITED STATES PATENTS
| | | | |
|---|---|---|---|
| 2,799,367 | 7/1957 | Dotto | 188/72.5 |
| 3,469,658 | 9/1969 | Forsythe | 188/72.4 X |
| 3,675,743 | 7/1972 | Thompson | 188/370 X |

Primary Examiner—Duane A. Reger
Attorney, Agent, or Firm—Wofford, Felsman, Fails & Zobal

[57] ABSTRACT

A hydraulic disc brake for a vehicle comprising a rotatable disc adapted to be coupled to a wheel for rotation therewith and a frame having a pair of cylinders in which are located pistons for moving brake shoes toward the disc for engagement therewith when fluid is admitted to the cylinders. A flexible cup is slidably located in each cylinder between its piston and its rear end for forming a movable seal between the cup and the wall of the cylinder. The cup comprises a forward wall having an annular side wall extending rearward therefrom; a central hub spaced inward from the annular side wall; and a plurality of angularly spaced webs extending radially between the central hub and the annular side wall.

7 Claims, 6 Drawing Figures

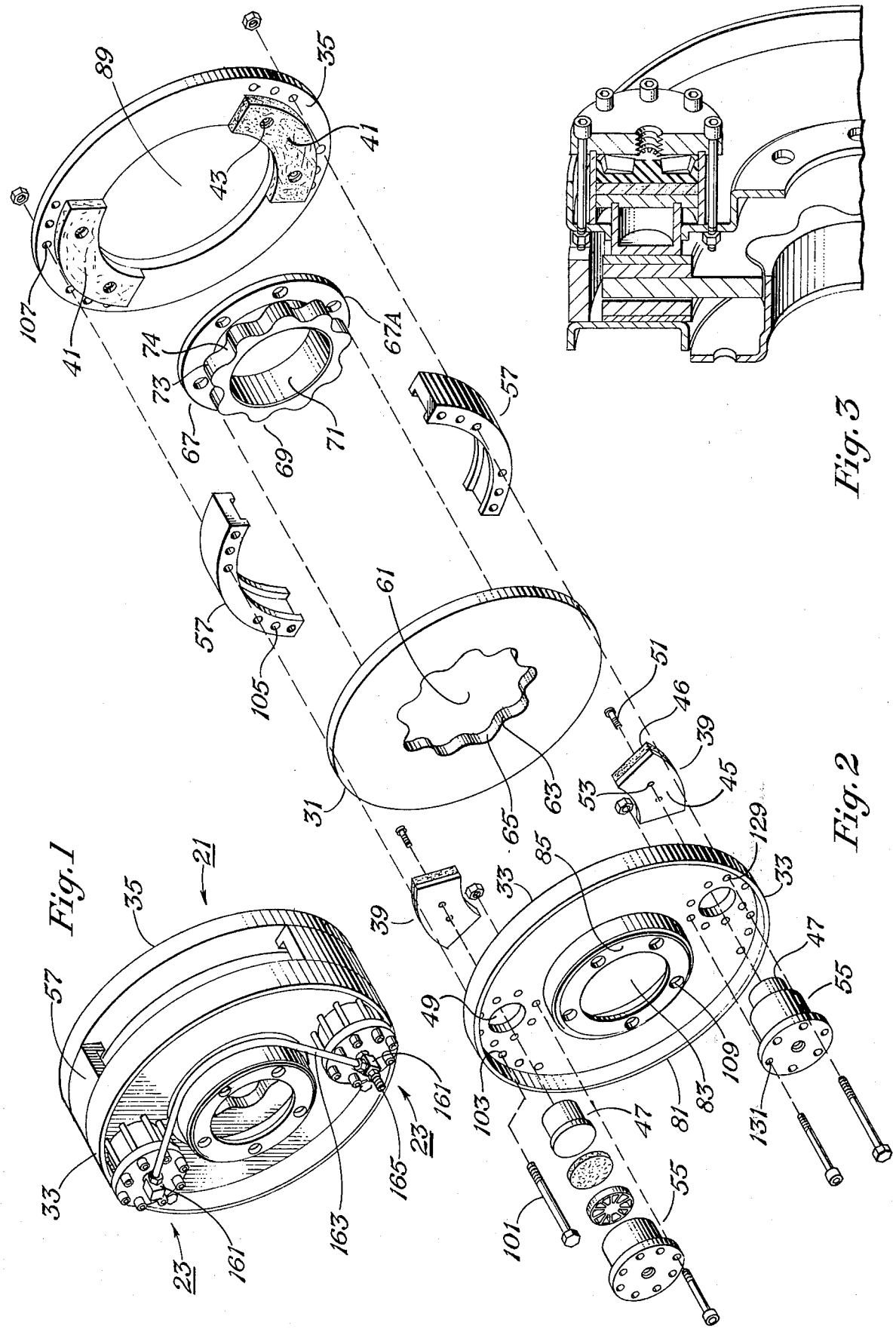

U.S. Patent   April 20, 1976   Sheet 2 of 2   3,951,241
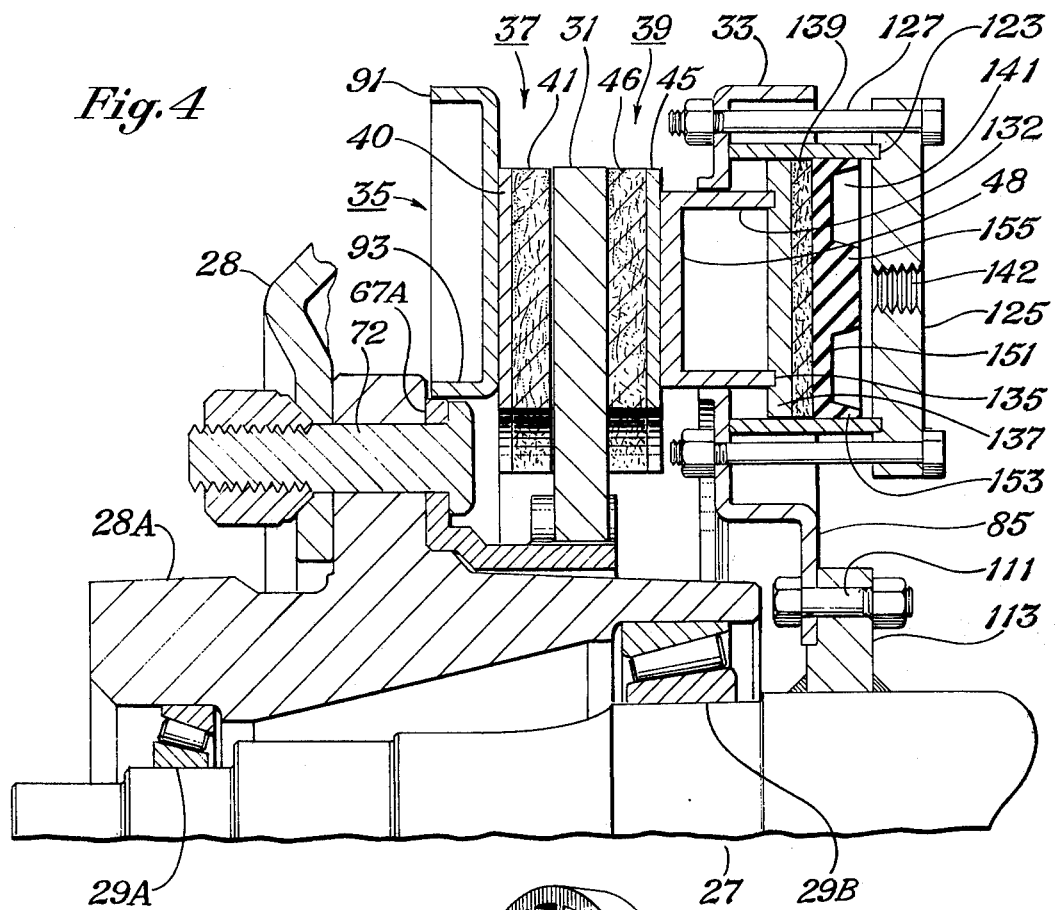
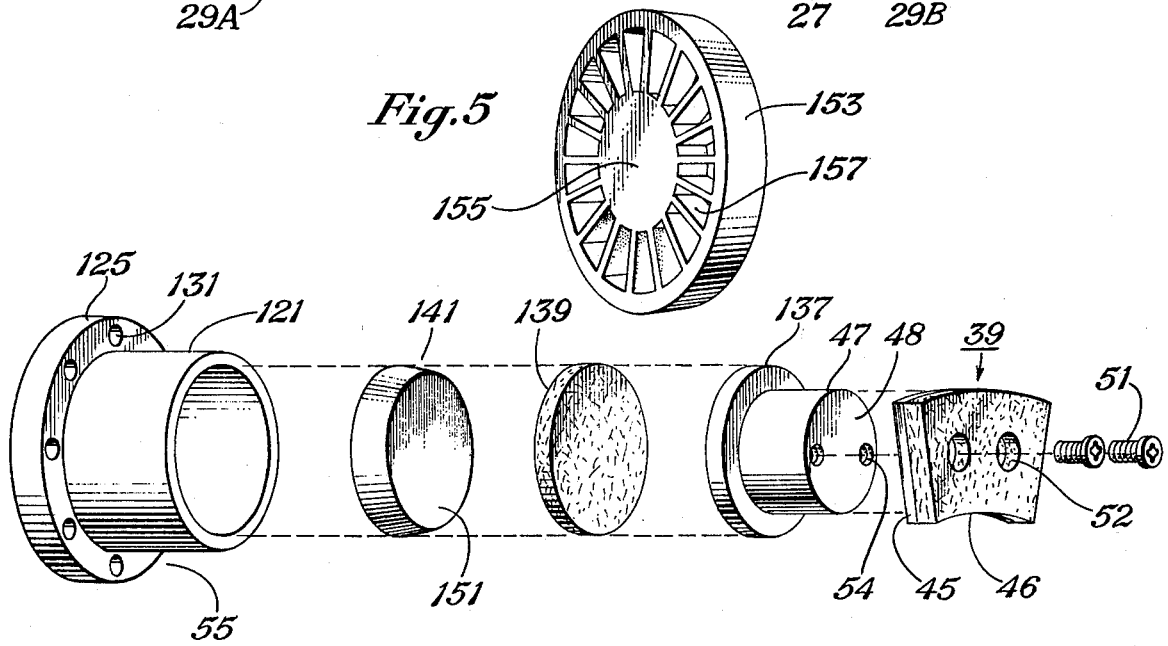

HYDRAULIC DISC BRAKE

BACKGROUND OF THE INVENTION

The present invention relates to a disc brake and more particularly to a simple, efficient, and effective hydraulic disc brake for vehicles used in the transportation industry.

SUMMARY OF THE INVENTION

It is an object of the present invention to provide a disc brake assembly for a wheel of a vehicle and which comprises a rotatable disc means adapted to be coupled to a wheel for rotation with the wheel about its axis; frame means adapted to be fixedly secured to the vehicle and including inner and outer housing means adapted to be located on opposite sides of said disc means with said outer housing means located on the outer side of said disc means and said inner housing means located on the inner side of said disc means. Brake shoe means adapted to be movably supported between said disc means and at least one of said housing means. At least two spaced cylinders are supported by said one housing means. Each cylinder has a forward end and a rear end with a fluid passage formed through its rear end. Piston means is slidably located in each cylinder and has a portion extending through the forward end of its associated cylinder for moving said brake shoe means into engagement with said disc means. Means is provided for admitting fluid under pressure to said cylinders through said fluid passages to move said piston means and hence said brake shoe means, toward said disc means for engaging said brake shoe means with said disc means. A flexible cup means is slidably located in each cylinder between its piston means and its rear end for forming a movable seal between said cup means and the wall of said cylinder. Each cup means comprises a forward wall with an annular side wall extending rearward therefrom, a central hub spaced inward from said annular side wall and extending rearward from said forward wall, and a plurality of angularly spaced wall support means extending radially between said central hub and said annular side wall.

In a further aspect, each of said piston means has a separate brake shoe means connected to its extending portion for movement therewith.

In the embodiment disclosed, the annular disc means is adapted to be coupled to a wheel around the axle of the vehicle for rotation with the wheel and for sliding movement in a direction along the axis of the axle. Stationary brake lining means is coupled to one of said housing means on a side facing said disc means said separate brake shoe means are connected to their piston means between said disc means and the other of said frame means for axial movement toward and away from said disc means. Fluid admitted under pressure to said cylinders moves said piston means and hence said brake shoe means, toward said disc means for engaging said disc means for moving said disc means toward and into engagement with said brake lining means coupled to said one housing means.

BRIEF DESCRIPTION OF THE DRAWINGS

FIG. 1 is a perspective view of a disc brake assembly of the present invention;

FIG. 2 is an exploded view of the disc brake assembly of FIG. 1;

FIG. 3 is a perspective cross-sectional view of the disc brake assembly of FIG. 1, through one of its hydraulic cylinders;

FIG. 4 is an enlarged cross-sectional side view of the disc brake assembly of FIG. 1, mounted on an axle and taken through one of its hydraulic cylinders;

FIG. 5 is a perspective rear view of one of the seal cups employed in each of the hydraulic cylinders of the disc brake assembly; and FIG. 6 is an exploded perspective view of one of the cylinders of the disc brake assembly, showing its seal cup, piston assembly, and brake shoe.

DETAILED DESCRIPTION OF THE INVENTION

Referring to FIGS. 1 and 2, the disc brake assembly disclosed therein is identified by reference numeral 21. It has two hydraulic cylinders 23 for actuating the disc brake for braking purposes. In use, two of these brakes will be employed on each axle of a wheel for controlling the wheels of the vehicle. The brakes may be employed on an unpowered following axle of a trailer of a tractor/trailer combination or they may be employed on a powered axle of the tractor or truck for controlling its wheels. In FIG. 4, the brake is shown connected to a following unpowered axle 27 of a trailer. The hub 28A of the wheel 28 is coupled to the axle 27 by way of bearings 29A and 29B and rotates freely about the non-rotatable axle 27.

Referring also to FIG. 3, the disc brake assembly comprises an annular disc 31, inner and outer housing or frame members 33 and 35 located on opposite sides of the disc 31, two stationary brake shoes 37 (see also FIG. 4) attached to the outer frame 35 between the frame and the disc 31 and two movable brake shoes 39 located between the inner frame 33 and the disc 31. Each stationary brake shoe 37 comprises an arcuate plate 40A and an arcuate friction or brake liner 41B connected together and to the outer frame 35 by bolts. In FIG. 2, the bolts are not illustrated, however, extend through apertures 43 formed through the friction liners 37 and arcuate plates 40. In FIG. 2, the arcuate plates 40 are not illustrated. Each of the brake shoes 39 also comprises an arcuate plate 45 and an arcuate friction or brake liner 47. Each movable brake shoe 39 is connected to a separate piston 47 the forward wall 48 of which extends through a separate aperture 49 formed through the inner housing 33. The liners 46 and arcuate plates 45 of the brake shoes 39 are connected together and to the forward walls 48 of the pistons 47 by way of bolts 51. As seen also in FIG. 6, these bolts extend through apertures 52 and 53 formed through lines 46 and plates 45 and are threaded into apertures 54 formed in the forward walls 48 of the pistons 47. Each piston 47 is movably supported within a cylinder 55 attached to the back side of the inner housing 33. As illustrated in FIG. 2, the two cylinders 55 are located on opposite sides of the housing 33 for movably supporting the two pistons 47 and hence the two brake shoes 39. Outer housing 35 is fixedly secured to the inner housing 33 by two spacers 57 while the inner housing 33 is fixedly attached to the axle 27, as will be described subsequently. The disc 31 is supported for rotation with the wheel 28 and for axial movement toward and away from the brake shoes 37. By way of the pistons 47 the brake shoes 39 are supported between the housing 33 and the disc 31 for axial movement toward and away from the disc 31. In braking operations, hydraulic fluid is admitted to the cylinders 55 for moving the pistons 47 and hence the brake shoes 39, toward the disc 31 for engaging their brake linings 46 with the disc 31 for moving the disc 31 toward and into engagement with the brake linings 41 of stationary shoes 37 for braking purposes.

The disc 31 comprises an annular steel member having a central aperture 61 formed therethrough with axially disposed teeth 63 formed on its inner periphery defining grooves 65 between the teeth. The disc 31 is supported for rotation with the wheel 28 around the axle by way of the flange adapter 67 and a guide member 69 which is an integral part of the flange adapter 67. The flange adapter 67 and the guide member 69 have a central aperture 71 formed therethrough respectively for receiving the hub 28A which is rotatably supported around the axle 27. In assembly, the flanged end 67A of the flange adapter 67 is connected to the hub 28A by way of bolts 72 which also connect the hub 28A to the wheel 28. The guide member 69 has a plurality of axially disposed teeth 73 formed around its outer periphery defining grooves 74 which mate with grooves 65 and teeth 63 respectively of the disc 31 such that the disc 31 may be fitted around and supported by the guide member 69. Thus, as the wheel 28 rotates, the flange adapter 67 and guide member 69 and the disc 31 rotate around the axle with the wheel. The clearance between the teeth and grooves of the disc 31 and guide 69 is such as to allow the disc 31 to slide axially on the teeth and grooves of the guide member 69 for braking purposes.

The inner frame member 33 comprises an annular member having a short annular side wall 81 extending from its outer periphery and a central aperture 83 for freely receiving the axle 27. As illustrated, the aperture 83 is formed through a rearward extending central portion 85 of the housing 33. The outer frame member 35 comprises an annular member having a central aperture 89 formed therethrough for freely receiving the flange adapter 67. The outer housing 35 has an annular side wall 91 extending around the outer periphery thereof and an annular side wall 93 extending from the inner periphery defining the aperture 89. As indicated above, the housings 33 and 35 are connected together by way of two spacers 57 to position their walls on opposite sides of the disc 31. Connection is by way of bolts 101 which extend through apertures 103 formed through housing 33, through apertures 105 formed through spacers 57 and through apertures 107 formed through housing 35. The housing 33 has apertures 109 formed through its central portion around the central aperture 83 for receiving bolts 111 for connecting the inner housing 33 to a flange 113 welded around the axle 27. Thus, when assembled in place, frame members 33 and 35 are fixedly connected together and to the axle of the vehicle.

Each of the cylinders 55 comprise a cylindrical wall 121 having one end fitted into an annular slot 123 formed in rear end structure 125 of the cylinder. The opposite end of the cylindrical wall 121 is fitted against the back side of the housing 33 around the aperture 49. Each of the cylinders 55 is secured in place by way of bolts 127 which extend through apertures 129 formed through the housing 33 around the apertures 49 and through apertures 131 formed through the rear walls 125 of the cylinders near their outer periphery. Each piston 47 comprises a cylindrical member 132 having a forward wall 48 against which the arcuate plate 45 of the shoe 39 is seated and attached. The opposite end of each piston 47 fits in an annular slot 135 formed in a rear circular plate 137. The plates 137 are adapted to be slidably located within the cylindrical walls 121 as illustrated in FIG. 4. Located within each cylinder 55, behind the circular plate 137, is a circular disc 139 which forms a heat shield. Also, located within each cylinder 55, behind the heat shield 139, is a flexible cup 141. Both the heat shield 139 and the cup 141 of each cylinder are adapted to slidably engage the inner wall of the cylindrical member 121 forming the cylinder 55. Formed through the rear wall 125 of each cylinder 55 is a threaded aperture 142 for admitting hydraulic fluid under pressure into the cylinder 55 for moving the piston 47 forward for engaging its brake shoe with the disc 31. The purpose of the cup members 141 is to form a fluid-tight seal between the cup members and the inner cylindrical walls of the cylinders 55.

As illustrated, each cup member 141 comprises a front wall 151 having an annular side wall 153 extending rearwardly therefrom. When located outside of the cylinder 55, the side wall 153 flanges outward in the rearward direction as shown in FIG. 6. A central hub 155 extends rearward from the wall 151 and is spaced inward from the annular wall 153. A plurality of angularly spaced webs 157 extend radially between the central hub 155 and the annular side wall 153. When fluid is admitted into a cylinder 55 under pressure, it applies pressure in an axial direction against the wall 151 to move the cup 141 and hence the heat shield 139 and the piston 47 in a forward direction to engage its shoe with the disc 31, whereby the disc 31 is moved into engagement with the lining 41 of the shoe 37 for braking purposes. At the same time, the fluid pressure exerts a radial force on the inside of the annular side wall 153 of the cup to form a seal between the side wall 153 of the cup 141 and the inner wall of the cylindrical member 121 of the cylinder 55. In the relaxed position, when fluid is not admitted under pressure, the angular momentum of the wheel allows the disc 31 to slide to a neutral position out of effective engagement with the lining 41 and at the same time, allows the pistons 47 to slide rearward to a neutral position wherein their brake shoe linings 47 are out of effective engagement with the disc 31. In the relaxed position, the webs 157 hold the annular walls 153 of the cups 141 outward against the inside walls of the cylinder 55 to maintain the seal.

As shown in FIG. 1, fittings 161 are threaded to the apertures 142 of each of the cylinders with a fluid conduit 163 coupled between each fitting. One of the fittings has an inlet 165 for admitting fluid directly to one of the cylinders and to the other cylinder by way of fluid conduit 163. The flexible cups 141 may be formed of a synthetic rubber capable of flexing and returning to its original shape and which is compatible with the hydraulic fluid employed. Such material is commercially available on the market. The heat shield may be formed from a molding compound composed of long spinning grade chrysotile asbestos fibers grade AAA. Since the cup 141 of each cylinder relies solely on the flexible webs 157 connected between the hub 155 and the annular side wall 153 for holding the side wall outward against the inside wall of the cylinder 55, it does not affect rearward movement of the piston 47 in the relaxed position, thereby allowing its brake shoe 39 to be disengaged from the disc 31 when braking is terminated. In one embodiment, two of the disc brake assemblies disclosed may be used on a 8,000–10,000 pound rated axle.

Although in the preferred embodiment the piston assemblies, including their cups 141, are disclosed as being employed in a brake having an axially slidable disc 131, it is to be understood that they may be employed in a hydraulic brake wherein the disc is fixedly attached to the wheel and movable brake shoes located on opposite sides of the disc are employed for braking purposes when actuated by hydraulic cylinders. Moreover, although the preferred embodiment discloses a separate brake shoe 39 for each piston 47, it is to be understood that a single annular movable brake shoe may be employed instead with both of the pistons 47 connected to the annular brake shoe.

In the preferred embodiment the brake of the present invention is a hydraulic actuated brake. The hydraulic fluid may be activated by the master cylinder of the prime mover; it could be powered by a vacuum booster or by an air over hydraulic system. The cup 141 may be formed of styrene butadiene, a synthetic rubber.

What is claimed is:

1. A disc brake assembly for a wheel of a vehicle comprising:
   an annular disc means adapted to be coupled to a wheel for rotation with the wheel about its axis,
   frame means adapted to be fixedly secured to the vehicle and including inner and outer housing means adapted to be located on opposite sides of said disc means with said outer housing means located on the outer side of said disc means and said inner housing means located on the inner side of said disc means,
   brake shoe means adapted to be movably supported between said disc means and at least one of said housing means,
   at least two spaced cylinders supported by said one housing means,
   each cylinder having a forward end and a rear end with a fluid passage formed through its rear end,
   piston means slidably located in each cylinder and having a portion extending through said forward end of its associated cylinder for moving said brake shoe means into engagement with said disc means,
   means for admitting fluid under pressure to said cylinders through said fluid passages to move said piston means and hence said brake shoe means toward said disc means for engaging said brake shoe means with said disc means, and
   flexible cup means slidably located in each cylinder between its piston means and its rear end for forming a movable seal between said cup means and the wall of said cylinder,
   each cup means comprising:
      a forward wall with an annular side wall extending rearward therefrom,
         a central hub spaced inward from said annular side wall and extending rearward from said forward wall, and
         a plurality of angularly spaced wall support means extending radially between said central hub and said annular side wall.

2. The disc brake assembly of claim 1 wherein:
   said brake shoe means is connected to said extending portions of each of said piston means for movement therewith.

3. The disc brake assembly of claim 1 wherein:
   each of said piston means has a separate brake shoe means connected to its extending portion for movement therewith.

4. A disc brake assembly for a wheel of a vehicle comprising:
   an annular disc means adapted to be coupled to a wheel around the axle of the vehicle for rotation with the wheel and for sliding movement in a direction along the axis of the axle,
   frame means adapted to be fixedly secured to the vehicle and including inner and outer housing means to be located on opposite sides of said disc means with said outer housing means located on the outer side of said disc means, and said inner housing means located on the inner side of said disc means,
   stationary brake lining means coupled to one of said housing means on a side facing said disc means,
   brake shoe means adapted to be movably supported between said disc means and the other of said housing means for axial movement toward and away from said disc means,
   at least two spaced cylinders supported by said one housing means,
   each cylinder having a forward end and a rear end with a fluid passage formed through its rear end,
   piston means slidably located in each cylinder and having a portion extending through said forward end of its associated cylinder for moving said brake shoe means into engagement with said disc means,
   means for admitting fluid under pressure to said cylinders through said fluid passages to move said piston means and hence said brake shoe means toward said disc means for engaging said brake shoe means with said disc means for moving said disc means toward and into engagement with said stationary brake lining means
   flexible cup means slidably located in each cylinder between its piston means and its rear end for forming a movable seal between said cup means and the wall of said cylinder,
   each cup means comprising:
      a forward wall with an annular side wall extending rearward therefrom,
         a central hub spaced inward from said annular side wall and extending rearward from said forward wall, and
         a plurality of angularly spaced wall support means extending radially between said central hub and said annular side wall.

5. The disc brake assembly of claim 4 wherein:
   said brake shoe means is connected to said extending portions of each of said piston means for movement therewith.

6. The disc brake assembly of claim 4 wherein:
   each of said piston means has a separate brake shoe means connected to its extending portion for movement therewith.

7. The disc brake assembly of claim 6 comprising:
   a flange adapter to be located around an axle of the vehicle and having a first end adapted to be coupled to a wheel on the inner side thereof for rotation with the wheel around the axle,
   said annular disc means being adapted to be located around the other end of said flange adapter inward of the wheel,
   said flange adapter having axially disposed guide means formed around the periphery of its other end and said annular disc means having mating guide means, axially disposed and formed on its inner periphery for securing said annular disc means to said flange adapter for rotation therewith and for allowing said annular disc means to move axially on said guide means of said flange adapter, said outer housing means being connected to said inner housing means by way of spacing means, said inner housing means being adapted to be attached to structure of the vehicle to prevent rotation of said inner and outer housing means, said stationary brake lining means being attached to said outer housing means, said brake shoe means being located between said disc means and said inner housing means.

* * * * *